US010889283B2

United States Patent
Henson et al.

(10) Patent No.: US 10,889,283 B2
(45) Date of Patent: Jan. 12, 2021

(54) METHOD OF RATIONALIZING BRAKE PEDAL POSITION SIGNAL, MASTER CYLINDER PRESSURE SIGNAL AND BRAKE TORQUE SIGNAL

(71) Applicants: Scott E Henson, Chelsea, MI (US); Dhaval D Shah, Rochester Hills, MI (US); Mohammed N Akhtar, Canton, MI (US)

(72) Inventors: Scott E Henson, Chelsea, MI (US); Dhaval D Shah, Rochester Hills, MI (US); Mohammed N Akhtar, Canton, MI (US)

(73) Assignee: FCA US LLC, Auburn Hills, MI (US)

( * ) Notice: Subject to any disclaimer, the term of this patent is extended or adjusted under 35 U.S.C. 154(b) by 264 days.

(21) Appl. No.: 16/186,065

(22) Filed: Nov. 9, 2018

(65) Prior Publication Data

US 2020/0148187 A1     May 14, 2020

(51) Int. Cl.
   *B60T 17/22*      (2006.01)
   *B60T 13/66*      (2006.01)
   *B60T 7/04*       (2006.01)

(52) U.S. Cl.
   CPC .............. *B60T 17/221* (2013.01); *B60T 7/042* (2013.01); *B60T 13/66* (2013.01); *B60T 2220/04* (2013.01); *B60T 2270/413* (2013.01); *B60T 2270/88* (2013.01); *B60W 2510/18* (2013.01); *B60W 2710/18* (2013.01); *B60W 2710/182* (2013.01)

(58) Field of Classification Search
   CPC combination set(s) only.
   See application file for complete search history.

(56) References Cited

U.S. PATENT DOCUMENTS

| | | | |
|---|---|---|---|
| 2017/0341636 A1 | 11/2017 | Henson et al. | |
| 2019/0193708 A1* | 6/2019 | Kordik | B60T 17/22 |
| 2020/0017110 A1* | 1/2020 | Herring | B60W 10/04 |

OTHER PUBLICATIONS

U.S. Appl. No. 15/165,315, filed May 26, 2016, Scott E. Henson et al.

* cited by examiner

*Primary Examiner* — Christian Chace
*Assistant Examiner* — Amelia Vorce
(74) *Attorney, Agent, or Firm* — Ralph E Smith

(57) ABSTRACT

In a method, a master cylinder pressure signal, a brake pedal position signal and a brake torque signal provided by an electronic control unit of an anti-lock braking system are rationalized. The master cylinder pressure signal is rationalized against the brake pedal position signal, the brake pedal position signal is rationalized against the master cylinder pressure signal and the brake torque signal is rationalized against the brake pedal position signal. The rationalizations utilize a difference between a maximum value of the signal being rationalized recorded during a maximum value learn period and a minimum value of the signal being rationalized recorded during a minimum value learn period. The rationalization is successful when this difference is greater than a rationalization value.

3 Claims, 5 Drawing Sheets

METHOD OF RATIONALIZING BRAKE PEDAL POSITION SIGNAL, MASTER CYLINDER PRESSURE SIGNAL AND BRAKE TORQUE SIGNAL

FIELD

The present invention relates to a method of rationalizing a brake pedal position signal, a master cylinder pressure signal and a brake torque signal.

BACKGROUND

In automotive vehicles, a brake event signal is used as an input for various diagnostic routines included in on-board diagnostics ("OBD") of the vehicle and also as an input for various control routines. A brake event signal as used herein means a signal that indicates that the brakes of the vehicle are being applied or are being released. The vehicle's OBD is implemented in one or more electronic control units in the vehicle, such as in an electronic control unit of the vehicle's engine management system. Control routines that control various aspects of the vehicle are also implemented in one or more electronic control units of the vehicle. By way of example and not of limitation, control and diagnostic routines that use the brake event signal as an input include misfire target learning, air conditioner control, diagnostics management, diagnostics management (freeze frame reporting), electric vacuum pump diagnostics, steering angle diagnostics.

Heretofore, a brake pedal position signal or a master cylinder pressure signal has often been used as the brake event signal. The brake pedal position signal is a signal that indicates the position of the brake pedal, such as along a travel range from fully depressed to fully released. The master cylinder pressure signal is a signal that indicates a pressure of brake fluid in the master cylinder. It should be understood that this pressure can be indicative of the pressure in any chamber of the master cylinder that is pressurized when a driver applies the brakes of the vehicle by pushing the brake pedal.

Modern vehicles are typically equipped with anti-lock braking systems that include an electronic control unit and hydraulics for preventing the brakes from locking when they are being applied. In some cases, the hydraulics are operable independently of the master cylinder to apply the vehicle's brakes. The control of the anti-lock braking system is often included in an electronic stability control system of the vehicle either as a separate anti-lock braking electronic control unit or as part of an electronic control unit of the electronic stability control system.

In vehicles having certain types of autonomous driver assistance systems, the autonomous driver assistance system has autonomous braking events in which the autonomous driver assistance system automatically causes the vehicle's brakes to be applied without the driver having pressed the brake pedal. It does so by causing the vehicle's brakes to be applied by the anti-lock braking system in which the hydraulics are operable independently of the master cylinder to apply the brakes. An autonomous braking event is a braking event that occurs when the autonomous driver assistance system determines that the vehicle should be braked and causes the vehicle's brakes to be applied without a driver pressing the brake pedal. One example of an autonomous driver assistance system having an autonomous braking event is adaptive cruise control where a vehicle having its cruise control active is automatically slowed as it approaches a vehicle in front of it, in some cases by the automatic application of the vehicle's brakes by the autonomous driver assistance system.

The electronic control unit of the anti-lock braking system provides a brake torque signal indicative of the amount of brake torque being applied during braking of the vehicle. It should be understood that brake torque signal in this context can be an analog signal having a level indicative of the brake torque or a digital value indicative of the brake torque being applied. In normal braking when the driver has depressed the brake pedal, the master cylinder provides pressurized brake fluid to the brakes to apply them. The master cylinder pressure signal is provided to the electronic control unit of the anti-lock braking system which uses it to determine the brake torque and generate the brake torque signal. In cases where the brakes are being operated by the anti-lock braking system either in an anti-lock braking action or in an autonomous braking event, the electronic control unit of the anti-locking braking systems determines the brake torque to be applied and generates the brake torque signal accordingly.

In autonomous driver assistance systems having autonomous braking events, the brake pedal position signal and the master cylinder pressure signal do not indicate all braking events as the autonomous braking events occurs independently of a driver pressing the brake pedal. When this occurs, the hydraulics of the anti-lock braking system operate independently of the master cylinder to apply the brakes in these situations. Thus, there is not a brake pedal position signal indicating that the brake pedal has been depressed or a master cylinder pressure signal indicative of pressurized brake fluid in the master cylinder.

Generally, in OBD diagnostics, the inputs to the diagnostic routines of the OBD are required to be rationalized. That is, each input of a sensed condition must be compared against another input of a sensed similar condition at essentially the same time and the two inputs must correlate with each other for the rationalization of the input to be determined to be successful.

FIG. 1 is a simplified block diagram of a prior art vehicle 100 having an engine management system referred to herein as EMS 102 and an electronic stability control system referred to herein as ESC 104. EMS 102 includes an EMS electronic control unit referred to herein as EMS ECU 106. ESC 104 includes an anti-lock braking system electronic control unit referred to herein as ABS ECU 108. It should be understood that ABS ECU 108 could be part of an electronic control unit (not shown) for ESC 104. ABS ECU 108 provides brake torque signal 110 as an input to EMS ECU 106. EMS ECU 106 also has as inputs a brake pedal position signal 112 and a master cylinder pressure signal 114.

A method for validating a brake torque signal for use as a brake event input signal is disclosed in U.S. Ser. No. 15/165,315 filed May 26, 2017. In this method, the brake torque signal is validated by first rationalizing a brake pedal position signal and a master cylinder pressure signal. Once the brake pedal position signal is successfully rationalized with the master cylinder pressure signal, the brake pedal position signal is rationalized with the brake torque signal and the brake torque is successfully validated when the brake pedal position signal is successfully rationalized with the brake toque signal after the brake torque signal has first been successfully rationalized with the master cylinder pressure cylinder. Upon the brake torque signal being successfully validated, the use of the brake torque signal as a brake event input signal is enabled. When the brake torque signal fails the rationalization, the use of the brake torque signal as a brake event input signal is disabled. More specifically in an aspect, the brake pedal position signal is rationalized with the master cylinder pressure signal by comparing transitions of the brake pedal position signal with transitions of the master cylinder pressure signal and determining whether the brake pedal position signal is successfully rationalized with the master cylinder pressure signal based on whether the transitions of the brake pedal position signal and transitions of the master cylinder pressure signal track each other. In an aspect, the brake torque signal is rationalized against the brake pedal position signal by comparing transitions of the brake pedal position signal with transitions of the brake torque signal and determining whether the brake torque signal is successfully rationalized against the brake pedal position signal based on whether the transitions of the brake pedal position signal and transitions of the brake torque signal track each other.

In an implementation of the foregoing method, absolute values were used in the rationalizations. To determine whether the signals made transitions, the signals are compared against transition thresholds for each of the signals and absolute values were used for these transition thresholds. Due to variabilities in vehicles, this presents a difficulty in finding absolute values that are accurate for all vehicles, which can result in false failures in the rationalizations.

SUMMARY

A method of rationalizing with an electronic control unit of a vehicle a brake pedal position signal, a master cylinder pressure signal and a brake torque signal. The method includes rationalizing with the electronic control unit a master cylinder pressure signal against a brake pedal position signal by with the electronic control unit recording a maximum value of values of the master cylinder pressure signal read during a brake pedal position signal maximum value learn period wherein the brake pedal position signal maximum value learn period is a period during which the brake pedal position signal is above a first brake pedal position signal rising set point, recording a minimum value of values of the master cylinder pressure signal read during a brake pedal position signal minimum value learn period wherein the brake pedal position signal minimum value learn period is a period during which the brake pedal position signal is at or below a first brake pedal position signal falling set point, determining that the rationalization of the master cylinder pressure signal against the brake pedal position signal failed when a difference between the maximum recorded value of the master cylinder pressure signal and the minimum recorded value of the master cylinder pressure signal is not greater than a master cylinder pressure signal rationalization value and upon determining that the rationalization of the master cylinder pressure signal against the brake pedal position signal failed setting a first fail flag that the rationalization of the master cylinder pressure signal failed. The method also includes rationalizing with the electronic control unit the brake pedal position signal against the master cylinder pressure signal by with the electronic control unit recording a maximum value of values of the brake pedal position signal read during a master cylinder pressure signal maximum value learn period wherein the master cylinder pressure signal maximum value learn period is a period during which the master cylinder pressure signal is above a master cylinder pressure rising set point, recording a minimum value of values of the brake pedal position signal read during a master cylinder pressure signal minimum value learn period wherein the master cylinder pressure signal minimum value learn period is a period during which the master cylinder pressure signal is at or below a master cylinder pressure signal falling set point, determining that the rationalization of the brake pedal position signal against the master cylinder pressure signal failed when a difference between the maximum recorded value of the brake pedal position signal and the minimum recorded value of the brake pedal position signal is not greater than a brake pedal position signal rationalization value and upon determining that the rationalization of the brake pedal position signal against the master cylinder pressure signal failed setting a second fail flag that the rationalization of the brake pedal position signal failed. The method further includes rationalizing with the electronic control unit a brake torque signal against the brake pedal position signal by with the electronic control unit recording a maximum value of values of the brake torque signal read during a second brake pedal position signal maximum value learn period wherein the second brake pedal position signal maximum value learn period is a period during which the brake pedal position signal is above a second brake pedal position signal rising set point, recording a minimum value of values of the brake torque signal read during a second brake pedal position signal minimum value learn period wherein the second brake pedal position signal minimum value learn period is a period during which the brake pedal position signal is at or below a second brake pedal position signal falling set point, determining that the rationalization of the brake torque signal against the brake pedal position signal failed when a difference between the maximum recorded value of the brake torque signal and the minimum recorded value of the brake torque signal is not greater than a brake torque signal rationalization value and upon determining that the rationalization of the brake torque signal against the brake pedal position signal failed setting a third fail flag that the rationalization of the brake torque signal failed.

In an aspect, the method further includes validating with the electronic control unit use of the brake torque signal as a brake event signal when none of the rationalizations of the master cylinder pressure signal, brake pedal position signal and brake torque signal failed and upon successfully validating the brake torque signal for use as the brake event signal, enabling use of the brake torque signal as the brake event signal for at least the diagnostic routines of the vehicle's onboard diagnostics that use the brake torque signal as the brake event input signal. In this aspect, the method further includes determining with the electronic control unit that the brake torque signal failed validation for use as the brake event signal when the rationalization of any of the validations of the master cylinder pressure cylinder signal, brake pedal position signal and brake torque signal failed and upon determining that the brake torque signal failed validation for use as the brake event signal, having the electronic control unit disable use of the brake torque signal as the brake event input signal during a current drive cycle for at least the diagnostic routines of the vehicle's onboard diagnostics that use the brake torque signal as the brake event input signal.

In an aspect, each of the master cylinder pressure maximum value learn period, brake pedal position signal maximum value learn period and brake torque signal maximum value learn period are each at least a respective first minimum period of time and each of the master cylinder pressure minimum value learn period, brake pedal position signal minimum value learn period and brake torque signal minimum value learn period are each at least a respective second minimum period of time.

In an aspect, two or more of the first minimum periods are the same and in an aspect, they are different. In an aspect, two or more of the second minimum periods are the same and in an aspect they are different.

In an aspect, the first and second brake pedal position signal rising set points are the same and in an aspect they are different. In an aspect, the first and second brake pedal position signal falling set points are the same and in an aspect they are different.

BRIEF DESCRIPTION OF THE DRAWINGS

The present invention will become more fully understood from the detailed description and the accompanying drawings, wherein.

DETAILED DESCRIPTION

Figure 1:
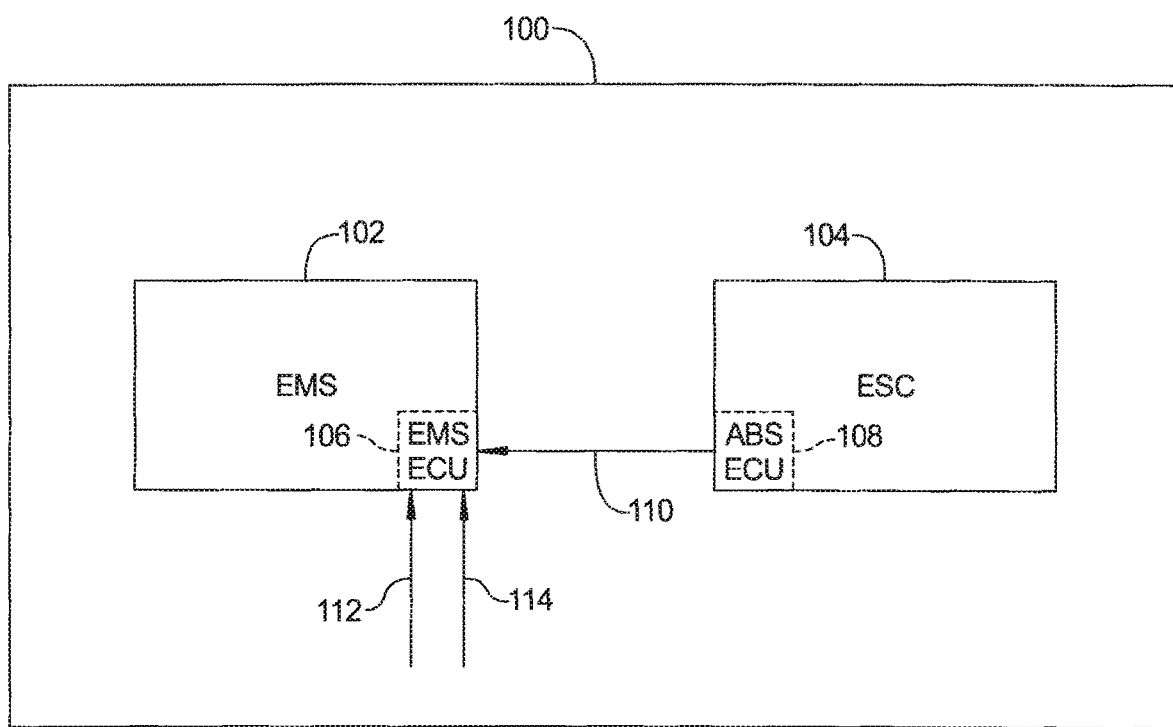
FIG. 1 is simplified block diagram of a prior art vehicle showing an engine management system of the vehicle and an anti-lock brake electronic control unit of an electronic stability control system of the vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

Figure 2A:
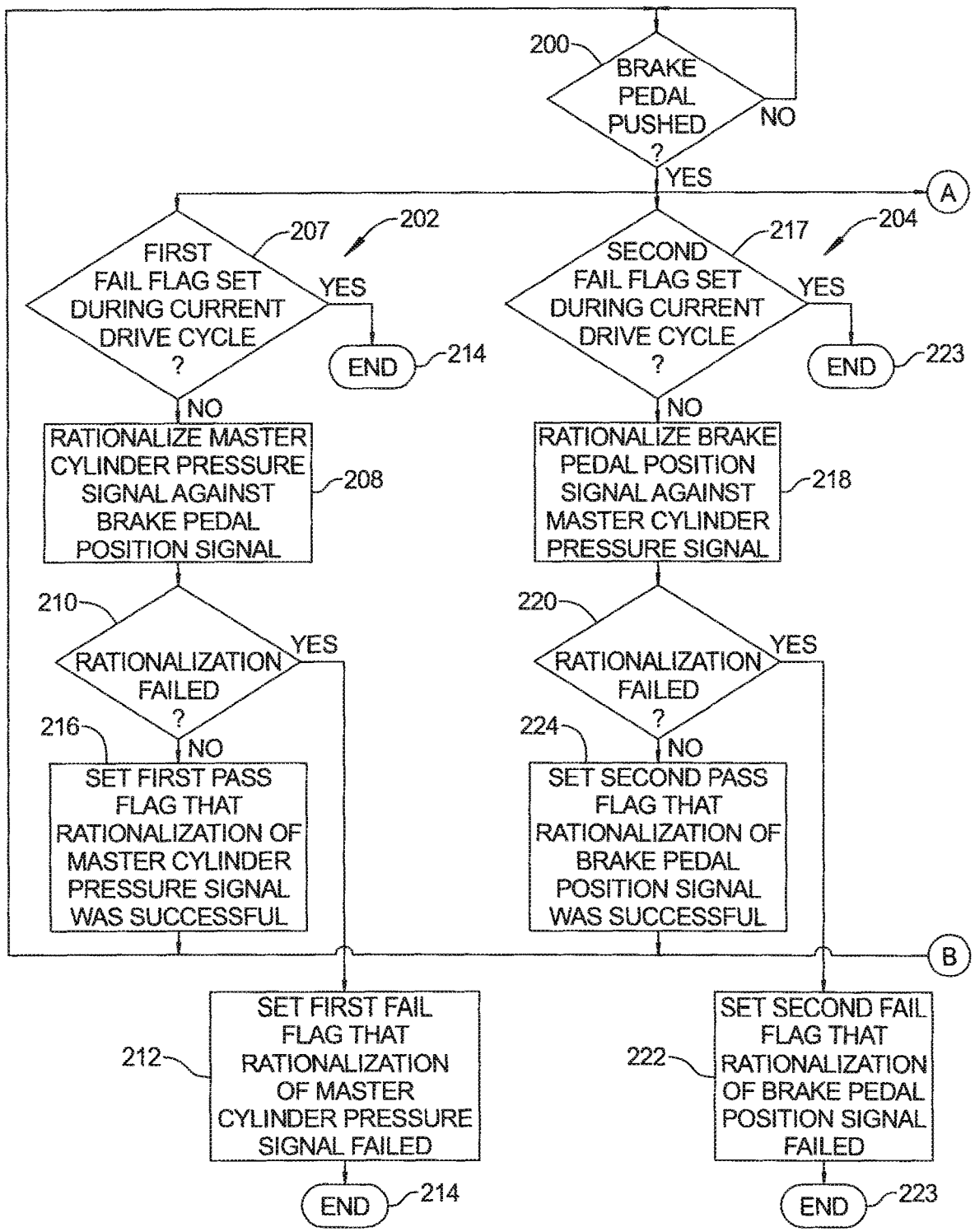
FIGS. 2A-2B show a flow chart of control logic for example routines in accordance with an aspect of the present disclosure to validate a brake pedal position signal, a master cylinder pressure signal and a brake torque signal for use as input signals for diagnostic routines in the vehicle's onboard diagnostics.
Figure 2B:
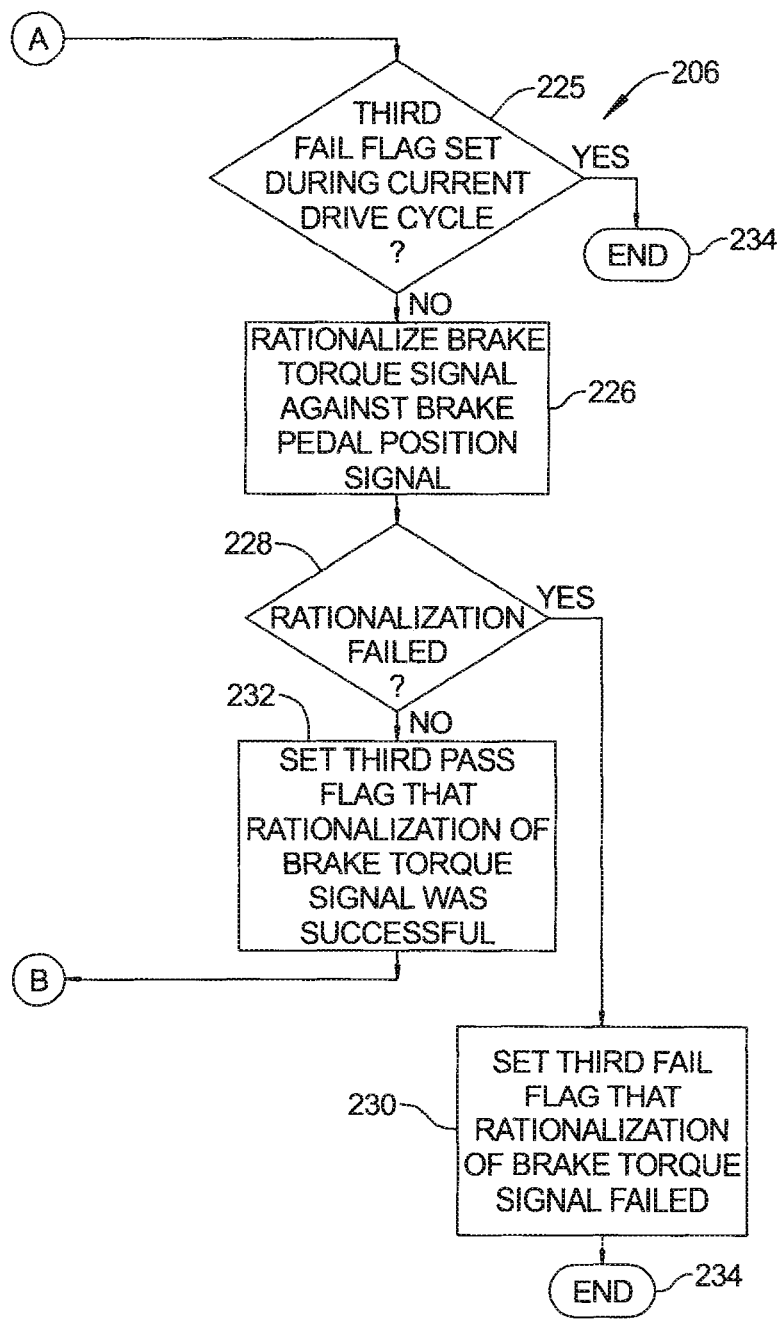

FIGS. 2A-2B show a flow chart of control logic for routines in accordance with an aspect of the present disclosure to validate the brake pedal position signal, the master cylinder pressure signal and the brake torque signal. The control logic starts at 200 where it checks whether the brake pedal of the vehicle has been pushed and if it has, it then proceeds to routines 202, 204, 206, which are three separate routines 202, 204 and 206 that are in effect processed in parallel when the brake pedal of the vehicle was pressed. Routine 202 rationalizes the master cylinder pressure signal against the brake pedal position signal, routine 204 rationalizes the brake pedal position signal against the master cylinder pressure signal, and routine 206 rationalizes the brake torque signal against the brake pedal position signal. It should be understood that routines 202, 204, 206 need not be processed in parallel and in aspect, routines 202, 204 are processed serially with routine 206 processed in parallel. In an aspect, routines 202, 204, 206 are processed serially. It should be understood that the three rationalization routines are executed only when the brake pedal is pushed. If an autonomous braking event occurs, the three rationalization routines are not executed. Also, if a rationalization failed during any of the rationalization routines, that rationalization routine is not rerun during the current drive cycle.

Routine 202 at 207 checks whether a first fail flag has been set during the current drive cycle. As discussed below, the first fail flag is set if the rationalization of the master cylinder pressure signal against the brake pressure signal failed. If at 207 the first fail flag was found to be set, the routine branches to 214 where it ends. If at 207 the first fail flag was not found to be set, the routine proceeds to 208 where it rationalizes the master cylinder pressure signal against the brake pedal position sensor and at 210 checks whether the rationalization failed. If this rationalization failed, the routine branches to 212 where it sets the first fail flag that rationalization of the master cylinder pressure signal failed and then branches to 214 where the routine ends. If at 210 this rationalization was successful, the routine branches to 216 where it sets a first pass flag that the rationalization of the master cylinder pressure signal was successful and then proceeds back to 200. It should be understood that the first pass flag and the first fail flag can be separate flags or can be the same flag with whether the flag is set or cleared indicating whether the rationalization of the master cylinder pressure signal failed or not. For example, the first fail flag being set indicates that the rationalization of the master cylinder pressure signal failed and the first fail flag being cleared indicates that the rationalization of the master cylinder pressure signal was successful.

Routine 204 at 217 checks whether a second fail flag has been set during the current drive cycle. As discussed below, the second fail flag is set if the rationalization of the brake pedal position signal against the master cylinder pressure signal failed. If at 217 the second fail flag was found to be set, the routine branches to 223 where it ends. If at 217 the second fail flag was not found to be set, the routine proceeds to 218 where it rationalizes the brake pedal positional signal against the master cylinder pressure signal and at 220 checks whether this rationalization failed. If this rationalization failed, the routine branches to 222 where it sets the second fail flag that the rationalization of the brake pedal position signal failed then branches to 223 where it ends. If at 220 this rationalization was successful, the routine proceeds to 224 where it sets a second pass flag that the rationalization of the brake pedal position signal was successful and then branches back to 200. It should be understood that the second pass flag and the second fail flag can be separate flags or can be the same flag with whether the flag is set or cleared indicating whether the rationalization of the brake pedal position signal failed or not. For example, the second fail flag being set indicates that the rationalization of the brake pedal position signal failed and the second fail flag being cleared indicates that the rationalization of the brake pedal position signal was successful.

Routine 206 at 225 checks whether a third fail flag has been set during the current drive cycle. As discussed below, the third fail flag is set if the rationalization of the brake torque signal against the brake pedal position signal failed. If at 225 the third fail flag was found to be set, the routine branches to 234 where it ends. If at 225 the third fail flag was not found to be set, the routine proceeds to 226 where it rationalizes the brake torque signal against the brake pedal position signal and at 228, checks whether this rationalization failed. If this rationalization failed, the routine branches to 230 where it sets the third fail flag that the rationalization of the brake torque signal failed and then branches back to 200. If at 228 this rationalization was successful, the routine branches to 232 where it sets a third pass flag that the rationalization of the brake torque signal was successful and then branches back to 200. It should be understood that the third pass flag and the third fail flag can be separate flags or can be the same flag with whether the flag is set or cleared indicating whether the rationalization of the brake torque signal failed or not. For example, the third fail flag being set indicates that the rationalization of the brake torque signal failed and the first fail flag being cleared indicates that the rationalization of the brake torque signal was successful.

It should be understood, that each routine continuously repeats during the current drive cycle unless its respective rationalization fails (as discussed above) as there can be conditions that occur as a vehicle is being driven, a sensor failure for example, that would make it inappropriate to continue to use the sensor signal being rationalized as an input to a diagnostic routine or control routine as the sensor failure might then result in a false determination that such a diagnostic or control routine (or routines) failed. The diagnostic and control routines that use the sensor signal as an input then check the status of the applicable flag for this sensor signal to determine whether they can use this sensor signal as an input act accordingly. For example, depending on the routine, the routine is disabled or the routine compensates for not being able to use the sensor signal as an input. As used herein and as commonly understood in the art of OBD diagnostics, a drive cycle is the period from when a vehicle is started until it is turned off, such as when an engine of a vehicle having an internal combustion engine is started until the engine is turned off.

Figure 3:
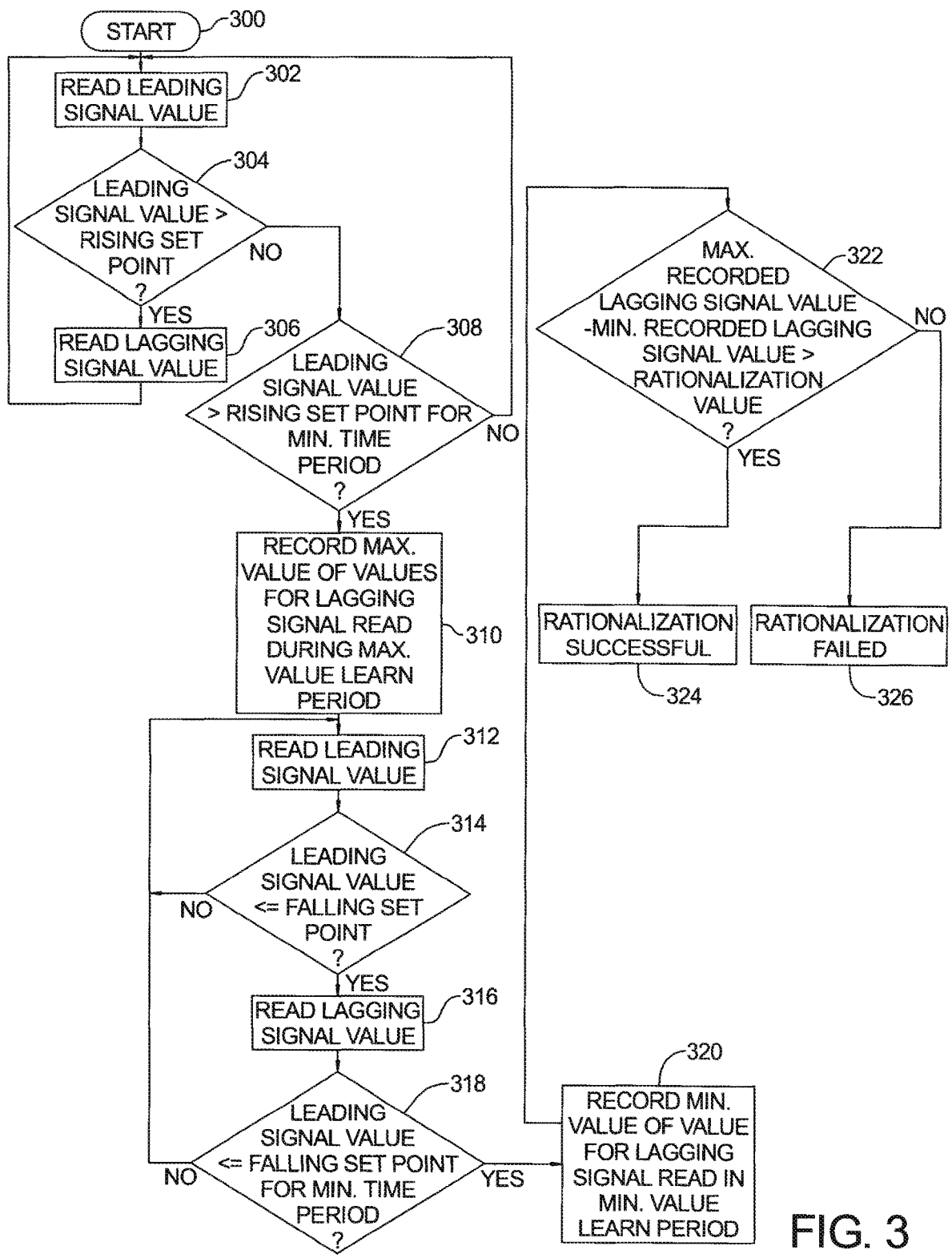
FIG. 3 is a flow chart showing logic for an example routine to rationalize a lagging signal against a leading signal in accordance with an aspect of the present disclosure.

FIG. 3 is a flow chart of control logic for a routine in accordance with an aspect of the present disclosure by which a lagging signal is rationalized against a leading signal and is utilized in performing the foregoing rationalizations. The routine rationalizes the lagging signal against the leading signal by determining that the lagging signal is changing sufficiently when the leading signal is changing. More specifically, the routine records a maximum value of the lagging signal during a maximum value learn period. The maximum value learn period is at least a first minimum period during which the leading signal is above a rising set point. The routine then records a minimum value of the lagging signal during a minimum value learn period. The minimum value learn period is at least a second minimum period during which the leading signal is at or below a falling set point. It should be understood that the first and second minimum periods can be the same period of time or different periods of time. The routine then checks whether a difference between the maximum recorded value of the lagging signal and the minimum recorded value of the lagging signal is greater than a rationalization value. If it is, then the rationalizing was successful. If not, the rationalization was not successful.

In accordance with an aspect of the present disclosure, this routine is used for the rationalizations of routines 202, 204 and 206 of FIGS. 2A-2B for rationalizing the, the master cylinder pressure signal against the brake pedal position signal, the brake pedal position signal against the master cylinder pressure, and the brake torque signal against the brake pedal position sensor. The differences among the rationalizations for the routines of FIGS. 202, 204,206 are the rising set point, the falling set point, the rationalization value, the maximum value learn period and the minimum value learn period. The rising and falling set points are set points for a leading signal against which a lagging signal is being rationalized. The rising set point is selected to be at a value where the leading signal has sufficiently risen that it is appropriate to record a maximum value of the lagging signal during the maximum value learn period. The falling set point is selected to be value where the leading signal has sufficiently fallen after rising above the rising set point that it is appropriate to record a minimum value of the lagging signal during the minimum value learn period. The rationalization value is selected to be a value that indicates that the difference between the maximum recorded value of the lagging signal (recorded during the maximum value learn period) and the minimum recorded value of the lagging signal (recorded during the minimum value learn period) is high enough to validly show that the lagging signal is changing as the leading signal is changing. In an aspect, any or all of the rising set point, falling set point and rationalization value are calibratable values. In another aspect, any or all of these are pre-set non-calibratable values.

In the case where the master cylinder pressure signal is being rationalized against the brake pedal position signal, the brake pedal position signal is the leading signal and the master cylinder pressure signal is the lagging signal. The rising set point is a brake pedal position signal rising set point, the falling set point is a brake pedal position signal falling set point, and the rationalization value is a master cylinder pressure signal rationalization value. The maximum value learn period is a brake pedal position signal maximum value learn period and the minimum value learn period is a brake pedal position signal minimum value learn period. In the case where the brake pedal position signal is being rationalized against the master cylinder pressure signal, the master cylinder pressure signal is the leading signal and the brake pedal position signal is the lagging signal. The rising set point is a master cylinder pressure signal rising set point, the falling set point is a master cylinder pressure signal falling set point, and the rationalization value is a brake pedal position signal rationalization value. The maximum value learn period is a master cylinder pressure signal maximum value learn period and the minimum value learn period is a master cylinder pressure signal minimum value learn period. In the case where the brake torque signal is being rationalized against the brake pedal position signal, the brake pedal position signal is the leading signal and the brake torque signal is the lagging signal. The rising set point is a second brake pedal position signal rising set point, the falling set point is a second brake pedal position signal falling set point, and the rationalization value is a brake torque signal rationalization value. In an aspect, the second brake pedal position rising set point is the same as the first brake pedal position rising set point and in an aspect the second brake pedal position rising set point is different than the first brake pedal position rising set point. In an aspect, the second brake pedal position falling set point is the same as the first brake pedal position falling set point and in an aspect the second brake pedal position falling set point is different than the first brake pedal position falling set point. The maximum value learn period is a second brake pedal position signal maximum value learn period and the minimum value learn period is a second brake pedal position signal minimum value learn period. These learn periods can be the same or different than the brake pedal position maximum value and minimum value learn periods discussed above for the rationalization of the master cylinder pressure signal against the brake pedal position signal.

It should be understood that the first minimum period of time for each of the maximum value learn periods can be the same or different and that the second minimum period of time for each of the minimum value learn periods can be the same or different.

The control routine starts at 300 and proceeds to 302 where it reads the current value of the leading signal, such as from the applicable sensor that senses the leading signal. At 304, the routine then checks whether the read value of the leading signal is above the rising set point. If so, at 306 the routine reads the current value of the lagging signal and branches back to 302. If at 304 the read value of the leading signal is not above the rising set point, the routine branches to 308 where it checks whether the read values of the leading signal have been above the rising set point for at least a first minimum period of time. As discussed above, the period during which the read values of the leading signal have been above the rising set point for at least the first minimum period of time is referred to herein as the maximum value learn period. If the read values of the leading signal have not been above the rising set point for at least the first minimum period of time, the routine branches back to 302. If at 308 the read values of the leading signal have been above the rising set point for at least the first minimum period of time, the maximum value of the lagging signal read during the maximum value learn period is recorded at 310 and the routine proceeds to 312.

At 312, the routine reads the current value of the leading signal and proceeds to 314 where it checks whether the read value of the leading signal has fallen to or below the falling set point. If at 314 the read value of the leading signal has not fallen to or below the falling set point, the routine branches back to 312. If the read value of the leading signal has fallen to or below the falling set point, the routine proceeds to 316 where it reads the current value of the lagging signal and then proceeds to 318. At 318 the routine checks whether the read values of the leading signal that were read after the leading signal has fallen below the rising set point have been at or below the falling set point for at least a second minimum time period. As discussed above, the period during which the read values of the leading signal have been at or below the falling set point for at least the second minimum period of time is referred to herein as the minimum value learn period. If the read values of the leading signal have not been at or below the falling set point for at least the second minimum period of time, the routine branches back to 312. If at 318 the read values of the leading signal have been at or below the falling set point for at least the second minimum period of time, the minimum value of the lagging signal read during the minimum value learn period is recorded at 320 and the routine proceeds to 322.

At 322 the routine checks whether the lagging signal has been changing sufficiently as the leading signal has been changing. It does so by checking whether a difference between the maximum recorded value of the lagging signal and the minimum recorded value of the lagging signal is greater than the rationalization value. If this difference exceeds the delta threshold, the rationalization is successful and the routine proceeds to 324. If not, the rationalization was not successful and the routine proceeds to 326.

Figure 4:
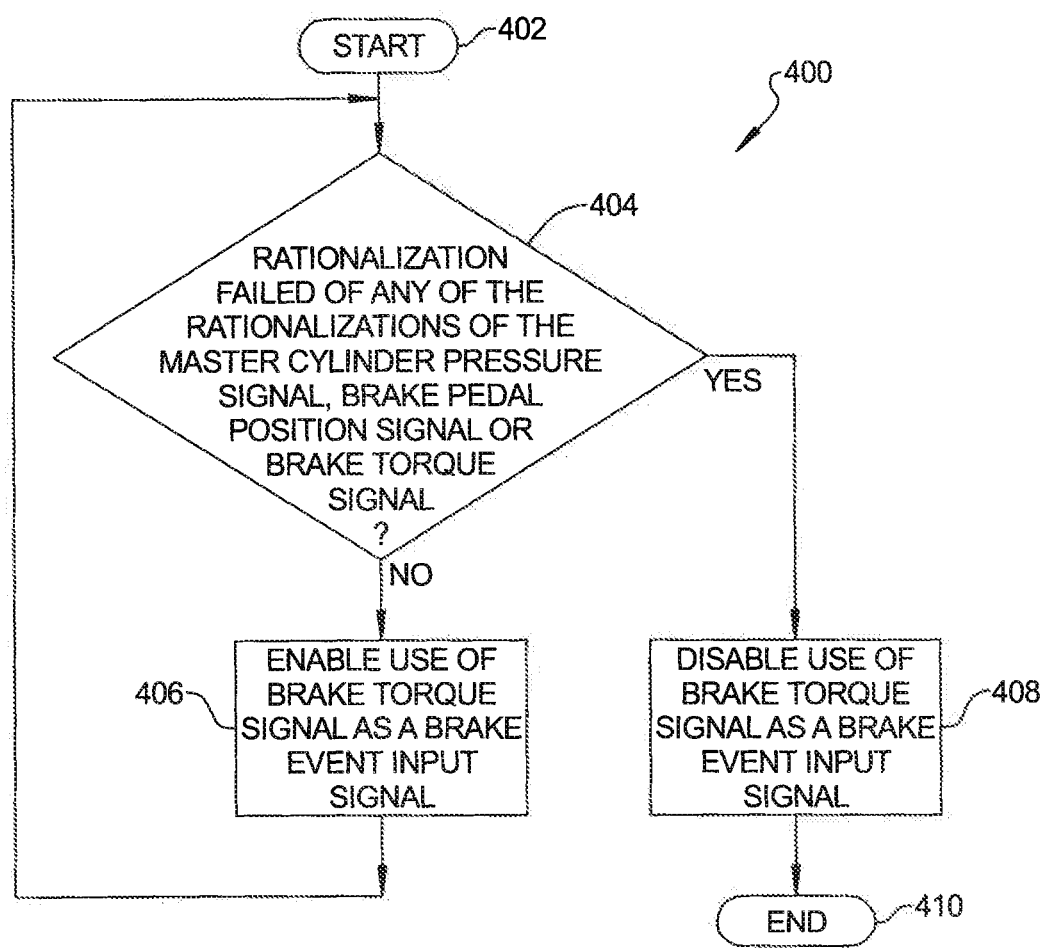
FIG. 4 is a flow chart showing of control logic for an example routine in accordance with an aspect of the present disclosure to validate use of a brake torque signal as a brake event signal for diagnostic routines in a vehicle.

In an aspect that may optionally be implemented, the brake torque signal is validated for use as a brake event signal for diagnostic routines that use the brake torque signal as an input and for control routines of the vehicle's electronic control units that do the same depending on whether validation of the of the brake torque signal was successful. FIG. 4 is a flow chart of control logic for a routine 400 that validates the brake torque signal for use as the brake event signal. The routine starts at 402 and proceeds to 404. At 404, the routine checks whether the validation failed of any of the validations of the master cylinder pressure signal, brake pedal position signal or brake torque. That is, whether any of the rationalizations of routines 202, 204 and 206 of FIGS. 2A-2B had failed. If none of the validations had failed, the routine proceeds to 406 where it enables the use of the brake torque signal as a brake event input signal and then branches back to 404. If at 404 any of validations had failed, the routine proceeds to 408 where it disables use of the brake torque signal as a brake event input signal and ends at 410.

The electronic control unit such as EMS ECU 106 in which the above described routines are implemented is or includes any of a digital processor (DSP), microprocessor, microcontroller, or other programmable device which are programmed with software implementing the above described methods. It should be understood that alternatively it is or includes other logic devices, such as a Field Programmable Gate Array (FPGA), a complex programmable logic device (CPLD), or application specific integrated circuit (ASIC). When it is stated that the electronic control unit performs a function or is configured to perform a function, it should be understood that the electronic control unit is configured to do so with appropriate logic (such as in software, logic devices, or a combination thereof).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of rationalizing with an electronic control unit of a vehicle a brake pedal position signal, a master cylinder pressure signal and a brake torque signal to validate them for use as input signals for diagnostic routines in the vehicle's onboard diagnostics, the method comprising:
rationalizing with the electronic control unit a master cylinder pressure signal against a brake pedal position signal with the electronic control unit:
recording a maximum value of values of the master cylinder pressure signal read during a brake pedal position signal maximum value learn period wherein the brake pedal position signal maximum value learn period is a period during which the brake pedal position signal is above a first brake pedal position signal rising set point;
recording a minimum value of values of the master cylinder pressure signal read during a brake pedal position signal minimum value learn period wherein the brake pedal position signal minimum value learn period is a period during which the brake pedal position signal is at or below a first brake pedal position signal falling set point;
determining that the rationalization of the master cylinder pressure signal against the brake pedal position signal failed when a difference between the maximum recorded value of the master cylinder pressure signal and the minimum recorded value of the master cylinder pressure signal is not greater than a master cylinder pressure signal rationalization value; and
upon determining that the rationalization of the master cylinder pressure signal against the brake pedal position signal failed, setting a first fail flag that the validation of the master cylinder pressure signal failed;
rationalizing with the electronic control unit the brake pedal position signal against the master cylinder pressure signal with the electronic control unit:

recording a maximum value of values of the brake pedal position signal read during a master cylinder pressure signal maximum value learn period wherein the master cylinder pressure signal maximum value learn period is a period during which the master cylinder pressure signal is above a master cylinder pressure rising set point;

recording a minimum value of values of the brake pedal position signal read during a master cylinder pressure signal minimum value learn period wherein the master cylinder pressure signal minimum value learn period is a period during which the master cylinder pressure signal is at or below a master cylinder pressure signal falling set point;

determining that the rationalization of the brake pedal position signal against the master cylinder pressure signal failed when a difference between the maximum recorded value of the brake pedal position signal and the minimum recorded value of the brake pedal position signal is not greater than a brake pedal position signal rationalization value; and upon determining that the rationalization of the brake pedal position signal against the master cylinder pressure signal failed, setting a second fail flag that the validation of the brake pedal position signal failed; and rationalizing with the electronic control unit a brake torque signal against the brake pedal position signal with the electronic control unit:

recording a maximum value of values of the brake torque signal read during a second brake pedal position signal maximum value learn period wherein the second brake pedal position signal maximum value learn period is a period during which the brake pedal position signal is above a second brake pedal position signal rising set point;

recording a minimum value of values of the brake torque signal read during a second brake pedal position signal minimum value learn period wherein the second brake pedal position signal minimum value learn period is a period during which the brake pedal position signal is at or below a second brake pedal position signal falling set point;

determining that the rationalization of the brake torque signal against the brake pedal position signal failed when a difference between the maximum recorded value of the brake torque signal and the minimum recorded value of the brake torque signal is not greater than a brake torque signal rationalization value; and upon determining that the rationalization of the brake torque signal against the brake pedal position signal failed, setting a third fail flag that the validation of the brake torque signal failed.

2. The method of claim 1 and further including:

validating with the electronic control unit use of the brake torque signal as a brake event signal when none of the validations failed of the validations of the master cylinder pressure signal, the brake pedal position signal, and the brake torque signal and upon successfully validating the brake torque signal for use as the brake event signal, enabling use of the brake torque signal as the brake event signal for at least the diagnostic routines of the vehicle's onboard diagnostics that use the brake torque signal as the brake event input signal; and determining with the electronic control unit that the brake torque signal failed validation for use as the brake event signal when the validation failed of any of the validations of the master cylinder pressure cylinder signal, brake pedal position signal and brake torque signal and upon determining that the brake torque signal failed validation for use as the brake event signal, having the electronic control unit disable use of the brake torque signal as the brake event input signal during a current drive cycle for at least the diagnostic routines of the vehicle's onboard diagnostics that use the brake torque signal as the brake event input signal.

3. The method of claim 1 wherein each of the brake pedal position signal maximum value learn period, master cylinder pressure signal maximum value learn period and brake torque signal maximum value learn period are each at least a respective first minimum period of time and each of the brake pedal position signal minimum value learn period, master cylinder pressure signal minimum value learn period and brake torque signal minimum value learn period are each at least a respective second minimum period of time.

* * * * *